Jan. 5, 1954 A. A. QUALMAN 2,664,645
LIQUID LEVEL
Filed July 30, 1952
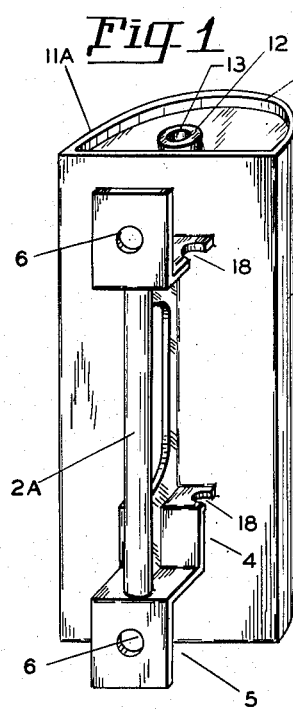
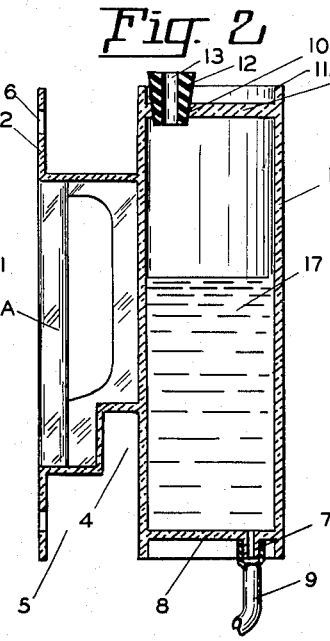
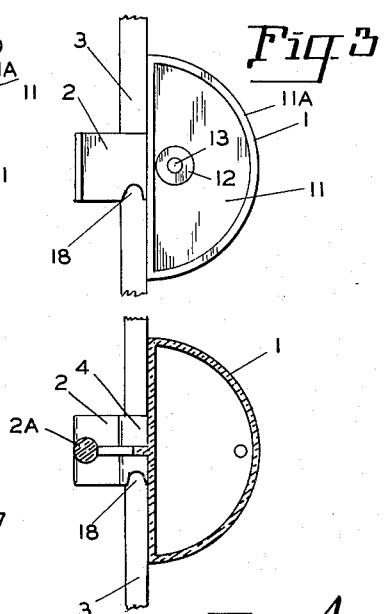
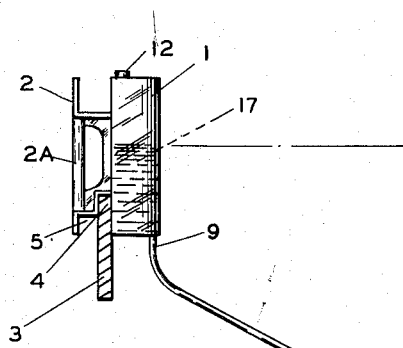
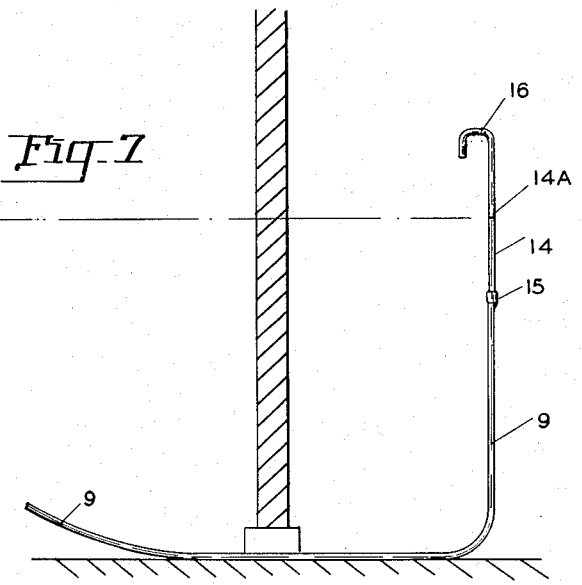
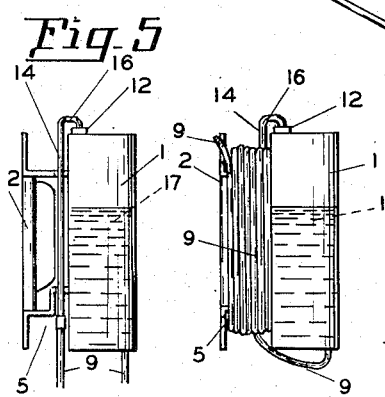
INVENTOR.
ALFRED A. QUALMAN
BY
ATTY.

UNITED STATES PATENT OFFICE 2,664,645

LIQUID LEVEL

Alfred A. Qualman, Charleston, Oreg.

Application July 30, 1952, Serial No. 301,691

4 Claims. (Cl. 33—209)

This invention relates to a device to be used for carrying a level point from one place to another within a circumscribed area.

The primary object of this invention is to provide a transparent master liquid container or vessel having a bracket forming part thereof adapted to support the same on various thicknesses of supporting objects, as for instance lumber framing or walls.

Another object of the invention is the providing of a flexible tube leading from the master vessel and having a transparent tube affixed to its opposite end for observing the water level corresponding to the water level shown by the master vessel.

A further object of my invention is the provision of a transparent tube at the end of the flexible rubber tube, having a goose-neck therein adapted to enter the cork of the master vessel, sealing the entire unit while in storage.

A still further object of my invention is the providing not only a bracket for supporting the master vessel, but also providing a reel for winding the flexible tubing therearound while the unit is in storage.

These and other incidental objects will be apparent in the drawings, specification and claims.

Referring to the drawings:

Figure 1 is a perspective view looking into the rear and bracket side of the master liquid vessel.

Figure 2 is a side sectional view, taken through the master vessel.

Figure 3 is a plan view of the vessel supported on a standard piece of lumber.

Figure 4 is a plan sectional view, the same as Figure 3.

Figure 5 illustrates how the transparent liquid level indicating tube is stored in connection with the master vessel before wrapping the hose about the bracket.

Figure 6 is the same as Figure 5, except that the hose has been wrapped around the bracket for storage.

Figure 7 illustrates my new and improved liquid level indicator in use.

Referring more specifically to the drawings:

My new and improved liquid level indicator consists of a master liquid containing vessel 1, having a bracket 2 forming part thereof and adapted to support the vessel upon a support, as for instance the piece of lumber 3. The bracket 2 has a step 4 adapted to fit on the lumber 3, but it also has a wider step 5 adapted to fit over thicker pieces of lumber in the use of the level indicating device. Holes 6 are also provided within the bracket for supporting the vessel on nails or other suitable supports. A vertical bar 2A provides a handle for moving the vessel about.

The vessel has a nipple 7 forming part of its bottom 8 adapted to receive a hose line 9, as best illustrated in Figure 2. An opening 10 is formed in the tube 11 of the vessel and is adapted to receive the cork or plug 12, the said cork having an opening 13 passing therethrough.

A transparent level indicating tube 14 is connected to the end 15 of the flexible tubing 9 and has a goose-neck 16 formed on its opposite end which is adapted to hang over the rim 11A or various other types of supports, or to be inserted within the opening 13 of the cork 12 when the device is not in use, as illustrated in Figures 5 and 6. This seals the entire assembly so that the liquid 17 will not escape. Cut-aways 18 are provided for receiving the transparent liquid indicating tube 14 while the same is in storage, as illustrated in Figure 4. After this liquid indicating tube is placed as illustrated, the tubing 9 is wrapped about the bracket 2 as illustrated in Figure 6.

In the operation of my new and improved liquid level, the master vessel 1 is located on a support 3 as desired. The transparent liquid indicating tube 14 is then taken to the point at which the operator desires to establish a level to correspond with the level of the liquid within the master vessel. This is best illustrated in Figure 7, the level being located behind an obstruction, as for instance a wall of a building.

The liquid indicating tube 14 is raised or lowered until the liquid level within the tube registers with a suitable indicating mark 14A located on the tube, therefore it can be readily understood that levels can be established remotely from the location of the master vessel 1, which in building operations is very useful and in many other operations where levels are to be established.

When my new and improved liquid level is not in use, the same is self-contained, the gauge 14 being stored so that it will seal the vessel and the tubing wrapped about the bracket support, still maintaining the liquid within the vessel for its next operation. The vessel is preferably made from a transparent material so that the level of the liquid can be seen at all times.

What I claim is:

1. An article for determining and maintaining level of liquid, comprising a container formed with openings in the top and bottom, a handle projecting from the container, said handle including upper and lower vertically extending flanges spaced from the container to form upper and lower depressions, a hose communicating at one end with the opening in the bottom of the container, and a U-shape nozzle at the free end of the hose, the hose being wrapped around in the depressions in the handle and the end of the U-shape nozzle fitting in the opening in the top of the container when the article is not in use.

2. An article as described in claim 1, wherein the handle is formed at its bottom with two depressions of different depths.

3. An article for determining and maintaining level of a liquid, comprising a container formed in its top and bottom with openings, a hose connected to and communicating with the opening in the bottom of the container, an upper flange extending from the container and having its free end bent upwardly to provide a depression, a lower flange extending from the container and having its outer end bent downwardly, the said lower flange being intermediately bent downwardly to form dual depressions the sides of the upper and lower flanges having aligned notches to form seats for the hose, a vertical bar connecting the two flanges, the flanges having openings to receive supports for the container.

4. An article for determining and maintaining the level of liquid, as defined in claim 3, wherein the free end of the hose has a U-shape nozzle, and a resilient plug having a central opening is seated in the opening in the top of the container to seal the latter when the hose is wrapped around the flanges in the depressions.

ALFRED A. QUALMAN.

References Cited in the file of this patent
UNITED STATES PATENTS

| Number | Name | Date |
| --- | --- | --- |
| 1,009,490 | Driscoll | Mar. 21, 1911 |
| 2,033,491 | Sprague | Mar. 10, 1936 |